US008442897B2

(12) United States Patent
Schulman

(10) Patent No.: US 8,442,897 B2
(45) Date of Patent: May 14, 2013

(54) SECURITIZATION OF SALES PARTICIPATION CERTIFICATES

(75) Inventor: Henry Evan C. Schulman, Boston, MA (US)

(73) Assignee: Tykhe, LLC, Boston, MA (US)

(*) Notice: Subject to any disclaimer, the term of this patent is extended or adjusted under 35 U.S.C. 154(b) by 575 days.

(21) Appl. No.: 11/057,552

(22) Filed: Feb. 14, 2005

(65) Prior Publication Data

US 2005/0222940 A1 Oct. 6, 2005

Related U.S. Application Data

(63) Continuation-in-part of application No. 10/153,052, filed on May 21, 2002, now Pat. No. 8,285,626, which is a continuation-in-part of application No. 10/131,051, filed on Apr. 24, 2002, now Pat. No. 7,149,719.

(60) Provisional application No. 60/543,983, filed on Feb. 12, 2004.

(51) Int. Cl.
*G06Q 40/00* (2006.01)

(52) U.S. Cl.
USPC .............................................. 705/37; 705/35

(58) Field of Classification Search ................ 705/36 R, 705/35, 37, 38, 39
See application file for complete search history.

(56) References Cited

U.S. PATENT DOCUMENTS

| | | | |
|---|---|---|---|
| 4,910,676 A * | 3/1990 | Alldredge | 705/37 |
| 5,745,885 A | 4/1998 | Mottola et al. | |
| 5,875,437 A | 2/1999 | Atkins | |
| 5,946,668 A | 8/1999 | George | |
| 5,983,206 A | 11/1999 | Oppenheimer | |
| 6,070,151 A * | 5/2000 | Frankel | 705/36 R |
| 6,088,685 A | 7/2000 | Kiron et al. | |
| 6,330,547 B1 | 12/2001 | Martin | |
| 6,345,262 B1 | 2/2002 | Madden | |
| 6,671,677 B2 | 12/2003 | May | |
| 6,684,189 B1 | 1/2004 | Ryan et al. | |
| 6,823,319 B1 | 11/2004 | Lynch et al. | |
| 6,904,414 B2 | 6/2005 | Madden | |

(Continued)

FOREIGN PATENT DOCUMENTS

| | | |
|---|---|---|
| JP | 2001-344420 A | 12/2001 |
| JP | 2001-357200 A | 12/2001 |

(Continued)

OTHER PUBLICATIONS

Lyons "PaineWebber hunts for new software investments," https://www.dialogweb.com/cgi/dwclient (PaineWebber Development Corp.) (Dec. 4, 1989).*

(Continued)

*Primary Examiner* — Ojo O Oyebisi
(74) *Attorney, Agent, or Firm* — Wolf, Greenfield & Sacks, P.C.

(57) ABSTRACT

The invention relates to financial products that provide a return that is a function of future sales/revenues, preferably gross sales/revenue, over a specified period of time. One embodiment of a method for creating such a financial product includes providing standard forms to an issuer and underwriter and standard terms to an issuer and investors. The terms to the issuer include providing capital to the issuer in exchange for a return that is a function of future sales over a specified period of time. The process further includes creating instruments representing investment in the financial product. The process creates the instruments in sufficient numbers and in appropriate denominations to facilitate trading in the financial product.

13 Claims, 8 Drawing Sheets

U.S. PATENT DOCUMENTS

| | | | |
|---|---|---|---|
| 6,941,281 B1 * | 9/2005 | Johnson | 705/40 |
| 7,555,451 B2 | 6/2009 | Rugge et al. | |
| 2002/0004735 A1 * | 1/2002 | Gross | 705/10 |
| 2002/0019805 A1 | 2/2002 | Kalotay | |
| 2002/0046158 A1 | 4/2002 | Kelly et al. | |
| 2002/0095368 A1 | 7/2002 | Tran | |
| 2002/0107789 A1 | 8/2002 | Wood | |
| 2005/0021453 A1 | 1/2005 | Lyman | |
| 2005/0027647 A1 | 2/2005 | Bershteyn | |
| 2005/0114259 A1 | 5/2005 | Almeida | |
| 2005/0149431 A1 | 7/2005 | Delaney | |
| 2005/0182702 A1 | 8/2005 | Williams, III | |
| 2005/0246267 A1 | 11/2005 | Nichols | |

FOREIGN PATENT DOCUMENTS

| | | | |
|---|---|---|---|
| JP | 2001344420 A | * | 12/2001 |
| JP | 2001357200 A | | 12/2001 |
| JP | 2004/192303 | | 7/2004 |

OTHER PUBLICATIONS

LeClair, et al., "Sales Certificates: A New Security", Jul. 2004, pp. 1-18.

International Search Report mailed Feb. 6, 2004 for International Application No. PCT/US03/12477.

Office Action dated Nov. 29, 2007 from co-pending U.S. Appl. No. 10/153,052.

Office Action dated Jun. 1, 2007 from co-pending U.S. Appl. No. 10/153,052.

"Bowie Bonds", printed Feb. 4, 2009 from http://en.wikipedia.org/wiki/Bowie_Bonds.

"David Bowie Bonds", printed Jan. 31, 2009 from http://www.morevalue.com/themes/bowie.html.

Leone et al., "Revenue Interest Financing: A Strategic Alternative to Accessing Capital Through Licensing in the Life Sciences," Dec. 2008.

Huang, "Royalty-Based Venture Financing Born in Boston, Could Shake up VCs and Startups from New England to the Northwest", http://www.xconomy.com/seattle/2009/10/07/royalty-based-venture-financing-born-in -boston-could-shake-up-vcs-and-startups-from-new-england-to-the-northwest/, Oct. 7, 2009.

Lyons, "PaineWebber hunts for new software investments," https://www.dialogweb.com/egi/dwclient (PaineWebber Development Corp.) (Apr. 9, 2012).

* cited by examiner

Sales Certificate Wesite

Welcome: "xxx"  Only a recognized broker/dealer can access the system using password and encryption.

Legend:
- Calculated by Program
- Input by Broker Dealer

Please Enter:

| Issuer's Name | Corrugated Cardboard Cans | | To Input Fee Scale |
|---|---|---|---|
| Issue Amount: ($ Mill) | 100 | 120 | |
| Maturity or Years to Maturity | 10 | 122 | |
| Current Sales: ($ Mill) | 1,000 | 124 | |
| Underwiter Fees | 2.0% | 126 | |
| Sales Growth Rate, Estimate | 10.0% | 128 | |
| Discount Rate | 8.0% | 130 | |

118

Enter:
- Name of Registrar: Fleet National Bank — Click Here
- Name of Trustee: JP Chase — Click Here Click Here to enter Sales estimates by year/quarter/month
Click Here to enter Yield Curve or Term Structure — 116

Net to Issuer ($ Mill) 98

Percent of Sales Required to Service this Issue = 0.9930% — 132
This will be calculated iteratively by our program (using a bisecting search or equivalent technique) that finds the discounted percent of sales whose present value equales the Issue Amount.

Click Here to retrieve your completed forms in a PDF file. These forms have been pre-approved by the SEC, and may be filed electronically with them. You should attach the issuer's finances and business history as the Appendix, along with the Opinion of Counsel.

Example of Issue, for demonstration purposes

Assumptions:

| Debt Repayment Rate = | 10.0% | | Operating Margin = | 40.0% | — 134 |
|---|---|---|---|---|---|
| | | | Corporate Tax Rate = | 35.0% | — 136 |

Standard Accounting [Debt] (000,000)

| | Year 1 | Year 2 | Year 3 | Year 4 | Year 5 | Year 6 | Year 7 | Year 8 | Year 9 | Year 10 | | Present Value |
|---|---|---|---|---|---|---|---|---|---|---|---|---|
| Sales | 1,000 | 1,100 | 1,210.0 | 1,331.0 | 1,464.1 | 1,610.5 | 1,771.6 | 1,948.7 | 2,143.6 | 2,357.9 | —1 | |
| Less | | | | | | | | | | | | |
| Participation | 0 | 0.0 | 0.0 | 0.0 | 0.0 | 0.0 | 0.0 | 0.0 | 0.0 | 0.0 | | |
| Operating Costs | 600 | 660.0 | 726.0 | 798.6 | 878.5 | 966.3 | 1,062.9 | 1,169.2 | 1,286.2 | 1,414.8 | —4 | |
| Operating Profit | 400 | 440.0 | 484.0 | 532.4 | 585.6 | 644.2 | 708.6 | 779.5 | 857.4 | 943.2 | —5 | |
| Interest on Debt | 8 | 7.2 | 6.4 | 5.6 | 4.8 | 4.0 | 3.2 | 2.4 | 1.6 | 0.8 | —6 | |
| Net Before Taxes | 392 | 432.8 | 477.6 | 526.8 | 580.8 | 640.2 | 705.4 | 777.1 | 855.8 | 942.4 | —7 | |
| Taxes | 137.2 | 151.5 | 167.2 | 184.4 | 203.3 | 224.1 | 246.9 | 272.0 | 299.5 | 329.8 | —8 | |
| Profit | 254.8 | 281.3 | 310.4 | 342.4 | 377.5 | 416.1 | 458.5 | 505.1 | 556.3 | 612.5 | —9 | |
| Debt Repayment | 10 | 10 | 10 | 10 | 10 | 10 | 10 | 10 | 10 | 10 | —10 | |
| Cash Flow | 244.8 | 271.3 | 300.4 | 332.4 | 367.5 | 406.1 | 448.5 | 495.1 | 546.3 | 602.5 | | 2,529.77 |
| Total Debt Repayment | 10 | 20.0 | 30.0 | 40.0 | 50.0 | 60.0 | 70.0 | 80.0 | 90.0 | 100.0 | —11 | |

Fig. 4A

Sales Certificate Accounting (000,000)

| | Year 1 | Year 2 | Year 3 | Year 4 | Year 5 | Year 6 | Year 7 | Year 8 | Year 9 | Year 10 | |
|---|---|---|---|---|---|---|---|---|---|---|---|
| Sales | 1,000 | 1,100 | 1,210.0 | 1,331.0 | 1,464.1 | 1,610.5 | 1,771.6 | 1,948.7 | 2,143.6 | 2,357.9 | |
| Less | | | | | | | | | | | |
|   Participation | 9.93 | 10.9 | 12.0 | 13.2 | 14.5 | 16.0 | 17.6 | 19.4 | 21.3 | 23.4 | 100.00 |
|   Operating Costs | 600 | 660.0 | 726.0 | 798.6 | 878.5 | 966.3 | 1,062.9 | 1,169.2 | 1,286.2 | 1,414.8 | |
| Operating Profit | 390.07 | 429.1 | 472.0 | 519.2 | 571.1 | 628.2 | 691.0 | 760.1 | 836.1 | 919.8 | |
|   Interest on Debt | 0 | 0 | 0 | 0 | 0 | 0 | 0 | 0 | 0 | 0 | |
| Net Before Taxes | 390.07 | 429.1 | 472.0 | 519.2 | 571.1 | 628.2 | 691.0 | 760.1 | 836.1 | 919.8 | |
|   Taxes | 136.5245 | 150.2 | 165.2 | 181.7 | 199.9 | 219.9 | 241.9 | 266.0 | 292.7 | 321.9 | |
| Profit | 253.5455 | 278.9 | 306.8 | 337.5 | 371.2 | 408.3 | 449.2 | 494.1 | 543.5 | 597.8 | |
|   Debt Repayment | 0 | 0 | 0 | 0 | 0 | 0 | 0 | 0 | 0 | 0 | |
| Cash Flow | 253.5455 | 278.9 | 306.8 | 337.5 | 371.2 | 408.3 | 449.2 | 494.1 | 543.5 | 597.8 | 2,553.26 |

| | Year 1 | Year 2 | Year 3 | Year 4 | Year 5 | Year 6 | Year 7 | Year 8 | Year 9 | Year 10 | Present Value |
|---|---|---|---|---|---|---|---|---|---|---|---|
| Sales | 1000.0 | 1100.0 | 1210.0 | 1331.0 | 1464.1 | 1610.5 | 1771.6 | 1948.7 | 2143.6 | 2357.9 | 12465.8 |
| Less | | | | | | | | | | | |
|   Participation>Amort | 0.0 | 0.0 | 0.0 | 0.0 | 0.0 | 0.0 | 0.0 | 0.0 | 0.0 | 0.0 | |
|   Operating Costs | 600.0 | 660.0 | 726.0 | 798.6 | 878.5 | 966.3 | 1062.9 | 1169.2 | 1286.2 | 1414.8 | |
| Operating Profit | 400.0 | 440.0 | 484.0 | 532.4 | 585.6 | 644.2 | 708.6 | 779.5 | 857.4 | 943.2 | |
|   Interest on Debt | 4.1 | 3.7 | 3.3 | 2.9 | 2.5 | 2.1 | 1.6 | 1.2 | 0.8 | 0.4 | 19.3 |
| Net Before Taxes | 395.9 | 436.3 | 480.7 | 529.5 | 583.2 | 642.2 | 707.0 | 778.3 | 856.6 | 942.8 | |
|   Taxes | 138.6 | 152.7 | 168.3 | 185.3 | 204.1 | 224.8 | 247.4 | 272.4 | 299.8 | 330.0 | |
| Net After Taxes | 257.3 | 283.6 | 312.5 | 344.2 | 379.1 | 417.4 | 459.5 | 505.9 | 556.8 | 612.8 | |
|   Debt Repayment | 10.0 | 10.0 | 10.0 | 10.0 | 10.0 | 10.0 | 10.0 | 10.0 | 10.0 | 10.0 | |
| Cash Flow / Earnings | 247.3 | 273.6 | 302.5 | 334.2 | 369.1 | 407.4 | 449.5 | 495.9 | 546.8 | 602.8 | 3147.8 |
|   Total Debt Repayment | 10.0 | 20.0 | 30.0 | 40.0 | 50.0 | 60.0 | 70.0 | 80.0 | 90.0 | 100.0 | 100.0 |
| Payable to Bond Holder | 14.1 | 13.7 | 13.3 | 12.9 | 12.5 | 12.1 | 11.6 | 11.2 | 10.8 | 10.4 | |

Fig. 6B

Percent of Sales Required to Service this Issue: 0.8022%

| | Year 1 | Year 2 | Year 3 | Year 4 | Year 5 | Year 6 | Year 7 | Year 8 | Year 9 | Year 10 | Present Value |
|---|---|---|---|---|---|---|---|---|---|---|---|
| Sales | 1000.0 | 1100.0 | 1210.0 | 1331.0 | 1464.1 | 1610.5 | 1771.6 | 1948.7 | 2143.6 | 2357.9 | |
| Less | | | | | | | | | | | |
|   Participation | 0.0 | 0.0 | 0.0 | 0.0 | 0.0 | 1.9 | 4.2 | 5.6 | 7.2 | 8.9 | 19.7 |
|   Operating Costs | 600.0 | 660.0 | 726.0 | 798.6 | 878.5 | 966.3 | 1062.9 | 1169.2 | 1286.2 | 1414.8 | |
| Operating Profit | 400.0 | 440.0 | 484.0 | 532.4 | 585.6 | 642.3 | 704.4 | 773.9 | 850.2 | 934.3 | |
|   Interest on Debt | 0.0 | 0.0 | 0.0 | 0.0 | 0.0 | 0.0 | 0.0 | 0.0 | 0.0 | 0.0 | |
| Net Before Taxes | 400.0 | 440.0 | 484.0 | 532.4 | 585.6 | 642.3 | 704.4 | 773.9 | 850.2 | 934.4 | |
|   Taxes | 140.0 | 154.0 | 169.4 | 186.3 | 205.0 | 224.8 | 246.5 | 270.8 | 297.6 | 327.0 | |
| Net After Taxes | 260.0 | 286.0 | 314.6 | 346.1 | 380.7 | 417.5 | 457.9 | 503.0 | 552.7 | 607.3 | |
|   Certificate Amortization | 8.0 | 8.8 | 9.7 | 10.7 | 11.7 | 11.0 | 10.0 | 10.0 | 10.0 | 10.0 | |
| Cash Flow / Earnings | 252.0 | 277.2 | 304.9 | 335.4 | 368.9 | 406.5 | 447.9 | 493.0 | 542.7 | 597.3 | 3148.0 |
| Payable to Cert Holder | 8.0 | 8.8 | 9.7 | 10.7 | 11.7 | 12.9 | 14.2 | 15.6 | 17.2 | 18.9 | 100.0 |

SECURITIZATION OF SALES PARTICIPATION CERTIFICATES

RELATED APPLICATIONS

This application is a continuation-in-part application of U.S. patent application Ser. No. 10/153,052 filed May 21, 2002 now U.S. Pat. No. 8,285,626, and entitled "Securitization of Sales Participation Certificates," which is a CIP of U.S. patent application Ser. No. 10/131,051, filed Apr. 24, 2002 now U.S. Pat. No. 7,149,719 and entitled "Securitization of Sales Participation Certificates," both of which are incorporated herein by reference in their entirety. This application also claims the benefit of, and priority to, U.S. Provisional Patent Application Ser. No. 60/543,983, filed Feb. 12, 2004, entitled "Sales Certificates: A New Security," and incorporated herein by reference in its entirety.

FIELD OF THE INVENTION

The invention relates to a new type of security and, more particularly, to securities that provide a return that is a function of future sales/revenue, preferably gross sales/revenue, over a specified period of time.

BACKGROUND OF THE INVENTION

Large firms, can raise funds in a variety of ways including: (1) borrowing from banks; (2) issuing their own obligations directly to investors; and (3) issuing their obligations to an entity that in turn issues its own obligations to investors. Securitization can impact each of these modes of raising funds and has become an efficient and inexpensive source of capital for businesses.

The parties to securities transactions are called issuers and investors. Issuers sell and investors buy and trade in securities with the help of market intermediaries. Underwriters distribute securities from issuers to investors. The initial sale of securities from issuers to investors is termed the primary market. Broker-dealers participate in, or maintain, secondary markets in which investors trade among themselves in securities. Tamar Frankel in Chapter 1 of Securitization, Structured Financing, Financial Asset Pools, and Asset-Backed Securities, incorporated herein by reference in its entirety, points out that a variety of securitized loans exist including mortgages, auto and light truck loans, credit card and trade receivables, computer leases and insurance premium loans.

One can describe securitization to date as the sale of financial instruments, representing ownership interests in, or secured by, a segregated, income-producing asset or pool of assets. The securitization transaction reduces or reallocates certain risks inherent in owning, or lending against, the underlying assets. The securitization transaction also ensures that such assets are more readily marketable and, thus, more liquid than ownership interests in, and loans against, the underlying assets.

Securities and debts are both obligations by one party to another. A primary distinction between securities and debts is that debts are less amenable to trading than are securities. The form, amounts, and terms of debts are negotiated between the lender and borrower and, as such, do not meet the conditions necessary to create active securities markets in them. Such markets need: 1) standard forms and terms rather than custom-made instruments; 2) the provision of instruments in numbers and denominations to facilitate trading; and 3) relatively low-cost information about the underlying assets. Debts lack these attributes.

While securitization brings greater liquidity to the markets and allows participants to better allocate the risks involved, many securities do not allow the investor to easily or fully inform himself as to his current financial position as determined by the securities. With respect to bonds, only the prices of on-the-run treasury bonds are readily available to market participants because there are so many individual bond issues traded (on-the-run treasury bonds are recently issued treasury bonds), and corporate debt issues have prepayment, conversion, roll-over and other features that are difficult to evaluate. With respect to equity or stocks, it is a demanding task to understand the accounting practices that generate the earnings per share figures used to value equity securities. The Association for Investment Management and Research (www.AIMR.com) requires members to successfully undertake years of courses and exams before it will award the practitioner with its Chartered Financial Analyst ("CFA") designation. Most CFA's work for large money management organizations. Thus, there is a need for financial products that provide an investor with easily obtainable and verifiable knowledge about what the investor is buying.

SUMMARY OF THE INVENTION

The invention relates to financial products that provide a return that is a function of future sales/revenues, preferably gross sales/revenues, over a specified period of time. As opposed to asset-backed securities, securitization in this instance represents property interest in the stream of payments representing an organization's sales or revenues. Thus, in a preferred embodiment, there are no assets segregated as collateral for this security. One embodiment of a method for creating such a financial product includes providing standard forms and terms to an issuer and to investors. The terms to the issuer include providing capital to the issuer in exchange for a return to the investor that is a function of future sales of the issuer over a specified period of time.

According to this embodiment, the terms to the investors are non-negotiable and there is no asset or collateral set aside to insure repayment of the investor's capital because the security expires worthless at maturity. Investors investing in the financial product provide capital to the issuer. Information about the issuer's obligations pursuant to the above-referenced terms comes at a low-cost relative to obtaining information either about a borrower in a conventional commercial loan context or about the earnings accruing to an account of an equity investor. The process further includes creating instruments representing investment in the financial product. The process creates the instruments in sufficient numbers and in appropriate denominations to facilitate trading in the financial product.

Another embodiment of the invention provides a system for preparing to register a sales participation based offering. The system includes: a memory for storing instructions; and a processor in communication with the memory. The processor utilizes the instructions stored in the memory for: receiving information regarding the amount of an issue desired by a potential issuer; receiving sales information related to current sales and to sales growth rate for the potential issuer; receiving discount rate information for the issue; and calculating a function of future sales of the issuer appropriate to service the issue. In one embodiment, the function of future sales is solely a function of future sales and is not a function of already completed sales or receivables. In an alternative embodiment, the function of future sales can be a function of completed sales or receivables in addition to being a function of future sales. For example, a sales certificates could provide a return that is a percentage of futures sales and the sales for the year the certificate issued which could include both future sales and sales that were already completed at the time of issuance of the certificate.

BRIEF DESCRIPTION OF THE DRAWINGS

The foregoing and other objects, features, and advantages of the invention will be apparent from the following description when read together with the accompanying drawings.

FIG. 4A illustrates one embodiment of a web site for generating forms for submission to the Securities and Exchange Commission (SEC) in association with performing the method of FIG. 1;

FIG. 4B illustrates an example of a profit and loss statement for a company that has raised capital using the method illustrated in FIG. 1, the profit and loss statement being a part of the web site of FIG. 4A.

FIGS. 6A and 6B are income statements for an issuer of debt and for an issuer of certificates, respectively;

DETAILED DESCRIPTION OF THE INVENTION

The invention relates to a new type of security or financial product, and, more particularly, to financial products that provide returns that are a function of future sales/revenues, preferably gross sales/revenues, over a specified period of time. Thus, future sales are distinct from already completed sales and are distinct from trade receivables (money that a firm currently expects to receive from already completed sales). For present purposes, this type of financial product is referred to as a securitized sales certificate or simply as a sales certificate. Also for present purposes, the term sales and the term revenues are used interchangeably. This invention contemplates a variety of ways of determining a firm's sales or revenues. In one embodiment, the sales or revenues are defined by sales or revenues as reported on a firm's income statements. This invention contemplates such sales reports to be any of gross, net of promotional discounts, and/or sales that have been booked for which the resulting income has been, or has yet to be, received. Embodiments of the invention relate to securities that provide a return that is a function of future sales as distinct from the securitization of trade receivables that are already on the books.

Figure 1:
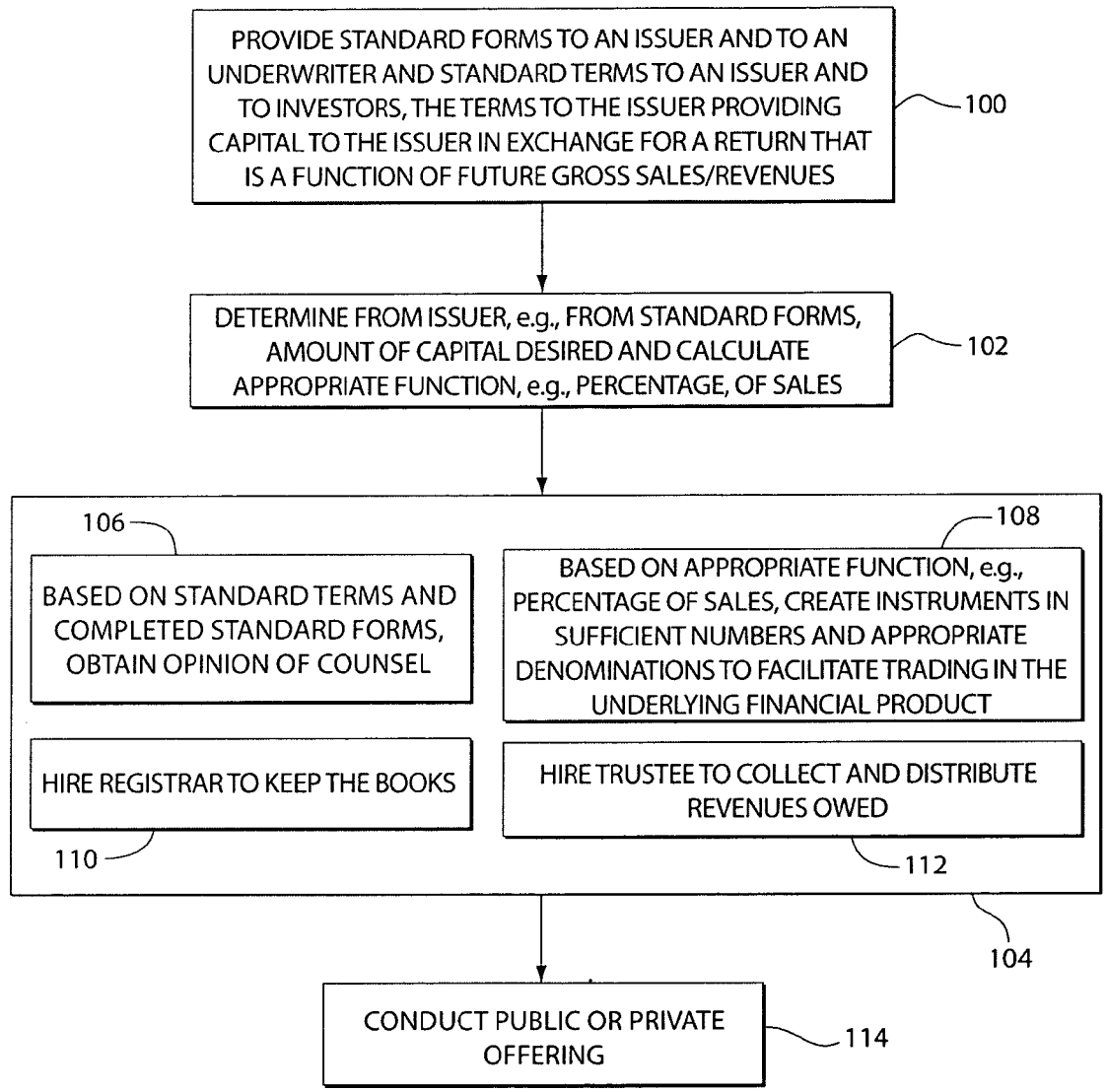
FIG. 1 illustrates one embodiment of a method according to the invention

With reference to FIG. 1, one embodiment of a method according to the invention includes providing 100 standard forms to an issuer and to an underwriter and standard terms to an issuer and to investors. The terms to the issuer include providing capital to the issuer in exchange for a return that is a function of future gross sales/revenues. The method further includes determining 102 from the issuer, e.g., from standard forms, the amount of capital desired and calculating an appropriate function, e.g., percentage, of sales to achieve the desired capital contribution to the issuer.

Based on an appropriate function, e.g., percentage, of sales, the method creates 108 instruments in sufficient numbers and appropriate denominations to facilitate trading in the underlying financial product. One embodiment of a method according to the invention, given a proposed issue amount, divides the issue amount by a fixed denomination to determine the number of instruments. The fixed denomination is such that the instruments are tradable securities given the then current market conditions. In other words, one can set the value of the fixed denomination to reflect the denominations of other existing securities, e.g., other similar securities, in the market. For example, if the issue amount is 1 million dollars and the fixed denomination is 100 dollars then the number of instruments is 10,000. Approximately concurrent with, and in one embodiment prior to, the creation of instruments, the method includes obtaining 106 opinion of counsel, based on the standard terms and completed standard forms, hiring 110 a registrar to keep the books, and hiring 112 a trustee to collect and distribute revenues owed. Finally, the method includes conducting 114 a public or private offering.

Thus, one embodiment of a method according to the invention securitizes a portion of the proceeds of future gross sales/revenues, an item that is easily audited, turning it into property that can be traded in a secondary market on an exchange, should an exchange arrange to trade in these securities, or over-the-counter (OTC). An OTC security is a security that is not traded on an exchange, usually due to an inability to meet listing requirements. For such securities, broker/dealers negotiate directly with one another and/or investor(s) over computer networks and by phone.

Figure 2:
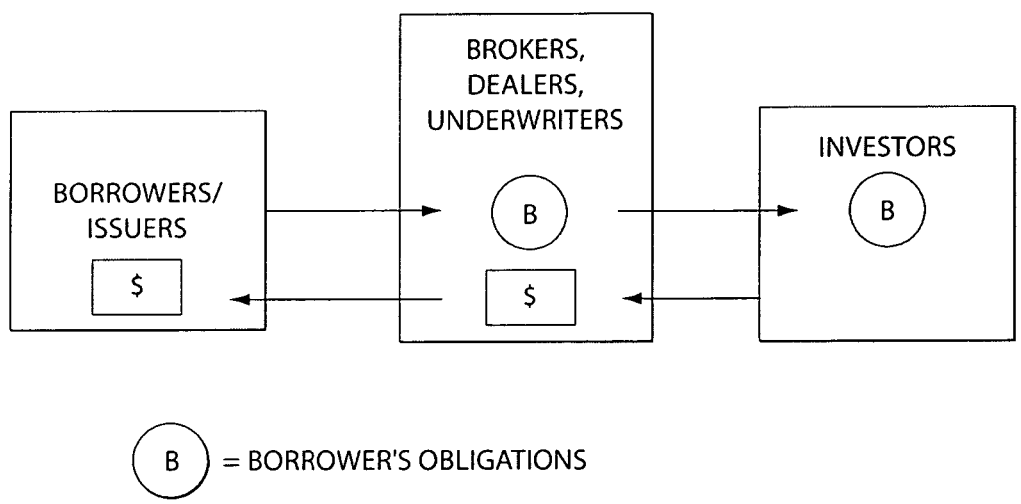
FIG. 2 illustrates the relationship between issuers, market intermediaries and investors in a primary market.

One embodiment of a method according to the invention includes creating a financial product by providing standard forms and terms between the issuer and the trustee who is the fiduciary representing the interests of the investor, and between the issuer and the underwriter who is to be paid for underwriting the issue. To clarify this point, typically issuers sell and investors buy and trade in securities with the help of market intermediaries. In the primary market, illustrated in FIG. 2, underwriters distribute securities from issuers to investors. In other words, an issuer provides the issuer's obligation to the underwriter in exchange for a commitment of capital. The underwriter in turn provides the issuer's obligation to investors in exchange for money. As noted above, the terms of the issuer's obligations, when issuing this security, include providing a return that is a function of future sales/revenues over a specified period of time. The trustee then collects and distributes revenues owed pursuant to the issuer's obligations outlined in the standard forms and terms.

Figure 3:
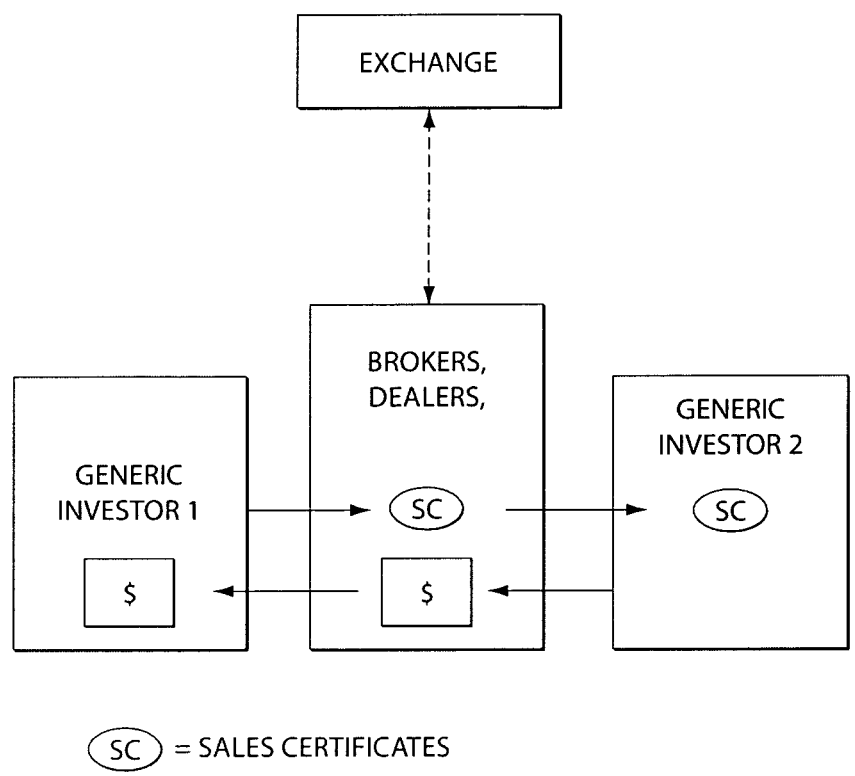
FIG. 3 illustrates the relationship between investors, broker/dealer(s), and possibly an exchange in a secondary market.

In the secondary market, illustrated in FIG. 3, a broker/dealer trades securities for money with investors. Thus, as illustrated, generic investor 1 can sell sales certificate(s) to a broker/dealer for money and generic investor 2 can purchase sales certificate(s) from the broker/dealer for money. The broker/dealer typically prefers to end each trading day with no inventory, i.e., with longs equal to shorts. In addition, if available, the broker dealer can trade as agent for investors on an exchange.

In one embodiment, the terms for the security are non-negotiable by the investors. One achieves the creation of instruments representing investment in the financial product by forwarding completed/executed forms and the terms of the initial public offering to a registrar who then keeps the books. In one embodiment of the invention, the forms and terms include instructions to the registrar as to how many instruments to issue to whom and in what denominations. In other words, the underwriter instructs the registrar as part of the process of conducting an initial public or private offering (IPO) to issue sales certificates to investors after the underwriter receives SEC approval and sufficient commitments from investors in the IPO.

An entity, e.g., an exchange or broker/dealer, involved in trading of a financial product according to the present invention publicizes the trades. This publicity reduces the cost of, and enhances the transfer of, information among market participants. The exchange (if there is one) or the broker/dealer involved in the trade has an interest in publicizing the fact that it is the market for the security in question; this interest is related to the recognized phenomenon that volume in trading often leads to further volume in trading. Properly publicized trading prices for financial products according to the present invention will generate less confusion and lower transaction costs than those experienced in the current bond markets. Evan Schulman and Charles Polk discuss transaction costs experienced in the bond markets in "Enhancing the Liquidity of Bond Trading," The Handbook of Fixed Income Technology, Edited by J. Rosen and R. D. Glisker, The Summit Group Press, pp. 185-194, incorporated herein by reference in its entirety.

Investors want to have greater knowledge of the underlying value or earning power of their investments than what is currently available. With respect to bonds, only the prices of on-the-run treasury bonds are readily available to market participants because there are so many individual bond issues traded. With respect to equity or stocks, recent reports of difficult to understand, and perhaps deceptive, accounting practices in large publicly-traded companies demonstrate the difficulty of delivering to the investor information relevant to valuing equity instruments. Compared to bonds and stocks, a financial product according to embodiments of the invention provides an investor with easier to understand and easier to verify information about what the investor holds or is buying or selling. Thus, using financial products according to embodiments of the invention, issuing firms should be able to access capital at a lower rate than available through conventional instruments. All things being equal between two financial products, an investor will pay more for the financial product about which the investor has greater knowledge, since greater knowledge implies less uncertainty about the risks involved.

In one embodiment, the underwriter issues sales certificates under an Opinion of Counsel pursuant to servicing agreements between the underwriter, trustee and the issuer. A registrar keeps the books and a trustee monitors the contract/servicing agreement and collects and distributes the revenues owed to the investors. Keeping the books includes taking in the above-referenced standard terms and forms and creating instruments, whether virtually or physically, representing investment in the associated financial product. The registrar follows the transfer instructions of either the exchange, if there is one involved, or the recognized broker(s)/dealer(s) and keeps track of who owns the instruments. The trustee and registrar may be the same fiduciary entity. In one embodiment, the issuers, the broker(s)/dealers, or the exchange can instruct the registrar to use book entry to help keep costs down. Book entry is the name given to a process where ownership and transfer of securities occurs in the books maintained by the registrar. No physical representation of ownership, such as stock or bond certificates is delivered to the investor.

Advantageously, embodiments of the invention ease the burden of auditing the activity of the issuer. The investor or those acting on behalf of the investor, e.g., analysts, need only examine the gross sales/revenues of the issuer. Thus, investors need no longer attempt to understand, or rely on the representations of others regarding the put and call options imbedded in corporate debt instruments, or the difficult to understand, and sometimes varying, accounting practices involved in determining a firm's earnings. As with all security transactions, taxable investors will need to keep records of transactions for capital gains purposes and, depending on accounting rules, may be able to depreciate their cost basis over the life on the instrument given that, in one embodiment, it expires worthless. By expiring worthless what is meant is that there is no repayment of principal, there are no balloon payments at maturity, and the issuer does not guarantee the investment with collateral or assets other than a guarantee of a specified function of future sales for a period of time.

Furthermore, embodiments of the invention provide transparency of trading, i.e., the investor can relatively easily determine the value of an instrument. Facilitating the creation of standardized instruments in sufficient quantities leads to ease of price reporting and hence the transparency of trading. In addition, embodiments of the invention may provide a tax advantage to the issuer in that accounting rules may allow the issuer to pay these obligations out of pre-tax gross sales/revenues.

Interestingly, F. Modigliani and M. H. Miller, in "The Cost of Capital, Corporation Finance and the Theory of Investment", *American Economic Review,* 48 (June) 261-97, incorporated herein by reference in its entirety, indicate that the debt-equity mix does not affect the value of a firm unless its tax liability is altered. This phenomenon is due to the fact that financing, in and of itself, does not alter a firm's earnings stream or the earning stream's present value. However, the additional transparency of the payoff from the invention's instrument should decrease the risks borne by investors due to the agency problems faced by management and the firm's accountants, and so increase the present value of the firm. Additionally, the instrument's expected increase in liquidity versus debt issues should decrease the price concession required to entice a buyer should the investor have to sell the security before maturity. This increase in liquidity should also increase the present value of the firm.

The invention stands in stark contrast to the opaqueness of equity earnings as exemplified in reports of recent accounting irregularities in large publicly-traded companies and with the involvement of at least one large accounting firm. According to embodiments of the invention, publicly available information imbedded in a firm's disclosure statements and the ease of auditing a firm's sales/revenue figures regulates the sales certificates markets provided by the invention.

More explicitly, enumerated benefits of embodiments of the invention include:

To the Issuer:
1.) In one embodiment, there is no repayment of principal (the security is self-eradicating). There will be no sinking funds and no balloon payments at maturity and there is no asset or collateral set aside to insure repayment of the investor's capital. Thus, according to present accounting practices, it appears that the issue can be off balance sheet. In other words, it appears that the firm can treat the sales certificates the same as a lease because the sales certificates, like simple leases, expire worthless at maturity. Sales certificates would be visible to investors because payments to the holders/investors of the sales certificates are a pre-tax charge to the firm and would feature prominently in the firm's income statement. Further, the existence of a sales certificate liability would be indicated by a footnote reference in the firm's balance sheet, similar to the treatment of the firm's lease obligations. In the event that according to accounting practices the issue cannot be off balance sheet, the issuer's profit and loss statement simply changes accordingly.

2.) There is no need to give up ownership to obtain financing at the discount rates that apply to growth vehicles.

3.) The firm can use the sales certificates to generate a continuous flow of funds (capitalizing future sales), if required. In other words, the firm can generate a continuous flow of funds by using rollovers, i.e., by re-capitalizing future sales as old issues expire.

To the Investor:

1.) Investors have the ability to participate in a firm's sales directly; they no longer need to be the residual claimant. The invention gives the investor a clearer understanding of results of the investment.

2.) The investor need not evaluate the imbedded options involved in fixed income investing: there are no call or put prepayment features. Stated another way, corporate bond issues are complicated financial instruments. They usually have prepayment clauses that are really call options. The borrower can exercise the prepayment clauses/call options to his advantage. Bonds also represent a put option in that the borrower can put the company or its assets to the lender when it is in the company's interest to do so.

3.) According to embodiments of the invention, investors can purchase, either directly or through pools or mutual funds that invest in sales certificates, diversified Baskets of High Cash-Flow vehicles (with expected growth if desired).

4.) Investors have the choice to concentrate their investments by investing in (a) specific firm(s) or using sector funds that invest in sales certificates, etc.

5.) Investors have available an alternative inflation hedge as opposed to Treasury Inflation Based Securities which reflect only the government calculated consumer price index (CPI). In other words, if inflation occurs, gross sales/revenues may also inflate, potentially providing investors of sales certificates with commensurate returns.

To the Underwriter:

1.) The underwriter deals in simple standard contracts. Such standard contracts result in lower underwriting costs than current customized fixed income contracts.

2.) The underwriter enjoys a continuous flow of business due to refinancing as earlier issues mature.

3.) The adoption of embodiments of the invention as a method of raising capital provides the potential for substantial refinancing activity.

4.) Sales Certificates are a complementary security and do not supercede equity. However, Sales Certificates may change the value of equities. Once Sales Certificates issue, the incentives of the equity holder and the Sales Certificate holder are aligned, if the percentage of participation is below a few percent of sales; both holders desire increased sales. Sales Certificates provide debt markets with competition This invention's securitization of future sales/revenues competes with currently available securities, especially fixed income securities. Embodiments of the invention contemplate a standardized set of high cash flow securities that competes with the fractionalized over-the-counter (OTC) bond market. Evan Schulman and Charles Polk discuss the fractionalized OTC bond market in the above-noted article "Enhancing the Liquidity of Bond Trading," The Handbook of Fixed Income Technology, pp. 185-194

It may be argued that securities according to the invention also provide competition for institutions that factor sales. Factoring companies (www.cfa.com) offer client firms cash for trade or sales receivables. They discount the receivables in question according to current interest rates and the risks of collecting. However, the sales the factoring companies discount are actual as opposed to future sales, and firms issuing sales certificates may still use the services of factoring companies to collect the revenues owed.

With reference to FIGS. 4A and 4B, one embodiment of a method according to the invention further includes a web site and/or non web-based systems for issuers or underwriters to register their offerings. A web site is advantageous to the extent it provides convenient, ubiquitous access to authorized users. However, the present invention also contemplates the use of non-Internet based access. Using encryption and password protection, the web site allows a potential issuer and/or an underwriter to provide relevant information. The web site provides, and optionally completes, initial public or private offering forms 116 for submission to the SEC. In one embodiment, the forms are SEC approved.

In the illustrated embodiment, the appropriate party, i.e., the user, enters the Issuer's Name 118, the proposed Issue Amount (e.g., in millions of dollars) 120, the issue's Maturity or the years to Maturity 122, the Current Sales of the Issuer 124 and the Underwriter Fees 126. The user then enters the Estimated Sales Growth Rate 128 and Discount Rate 130; or the user may enter the sales (absolute dollar value or percent growth) and/or discount data by year, quarter or month.

Given this input, according to one embodiment, a program accessed via the web site calculates the Percent of Sales 132 Required to Service this Issue. This is an iterative calculation (using a bisecting search or equivalent technique) that finds the discounted percent of sales with a Present Value equal to the Issue Amount.

Should the user wish to compare the costs of this issue with standard debt issues, they may enter the issuer's Operating Margin 134 and Corporate Tax Rate 136 along with the debt issue's Sinking Fund Obligations, if any. The program accessed via the web site then calculates Profit and Loss Statements for the Issuer for the years the Sales Certificates will be outstanding. One embodiment of the program calculates three (3) profit and loss statements: one for a sinking fund bond issue, one for a balloon payment issue, and one for a sales certificate issue. The user, e.g., the underwriter, is then able to compare the firm's cash flows under the three alternatives. The web site can come in a variety of forms as will be obvious to those of skill in the art. For example, the web site may present only two profit and loss statements: one for a sinking fund bond issue and one for a sales certificate issue as illustrated in FIGS. 4A and 4B.

Finally, if the Underwriter wishes to go ahead and file the proposed issue with the SEC, the underwriter supplies the names of the Registrar and Trustee, as previously arranged, together with their fee scale, and requests appropriate forms. In one embodiment, the program accessed via the web site generates appropriate forms, the blank versions of which may have been pre-approved by the SEC. The completed forms include the information input by the underwriter and the results of calculations made there from. The resulting forms can be in a PDF format that cannot be altered. The Underwriter can then review them, add the Issuer's Financial History, Description of Business and relevant Ownership and Officer information along with an Opinion of Counsel and file the combined package with the SEC.

Description of Profit & Loss Statements in FIGS. 4A and 4B:
Line 1, Sales:
This is the Sales figure input by the Underwriter, grown annually by the Sales Growth Rate input. (or as input by the Underwriter by year/quarter or month)
Line 3, Participation Payment:
Calculated using the result in the Required Percent of Sales calculation times the sales figure for the relevant year.
Line 4, Operating Costs:
Calculated using the Underwriter's assumed Operating Margin times the sales figure for the relevant year.
Line 5, Operating Profit:
Sales minus Participation and Operating Costs
Line 6, Interest on Debt:
The interest payment required to service the Issue Amount outstanding should the Issuer have used debt to generate the Issue Amount.
Line 7, Net Before Taxes:
Operating Profit less Interest on Debt.
Line 8, Taxes:
The taxes owed using the Tax Rate supplied by the Underwriter.
Line 9, Profit:
Net Before Taxes less the Taxes
Line 10, Debt Repayment:
The amount paid to retire the Issue Amount should the Issuer have used debt to generate the Issue Amount
Line 11, Cash Flow:
Profit less the Sinking Fund (Debt Repayment) On the right hand side of the statement we calculate the Present Value of the Cash Flow for comparison purposes.

The profit and loss statement for the sales certificate accounting shown in FIG. 4B assumes that accounting rules allow the issuer to pay its sales participation obligations out of pre-tax sales/revenue. In the event that accounting rules do not allow the issuer to do so, one would change the profit and loss statement accordingly.

Figure 5:
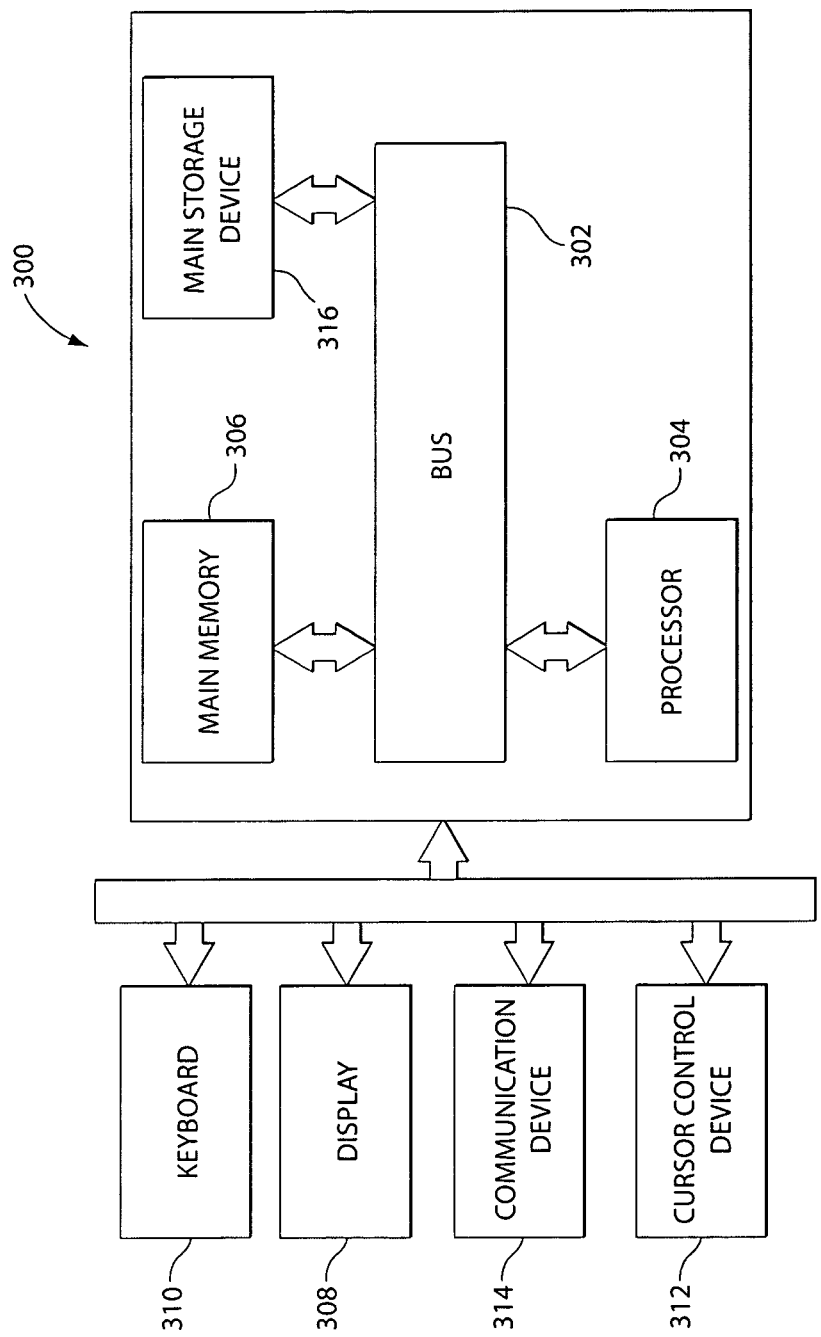
FIG. 5 is a block diagram illustrating one embodiment of a computer system for implementing methods of the present invention.

With reference to FIG. 5, a system 300 for executing a program accessed via the web site of FIG. 4A and/or via a non web-based system includes a bus or other communication channel 302 for communicating information between components of the system. The system 300 further includes a processor 304 coupled to the bus 302 and a main memory, e.g., a random access memory (RAM) or other dynamic storage device 306 also coupled to the bus. The RAM stores instructions for execution by the processor 304. The main memory can also store temporary variables. The system can include a mass storage device 316 coupled to the bus 302 for storing information that is not accessed as regularly as information stored in RAM.

System 300 can include a display 308 for displaying information and input devices such as a cursor control device 312 and a keyboard 310 for allowing a user to input data. The system can further include a communication device 314 for communicating with other systems, e.g., a client.

An implication of the invention is that certain non-profit institutions may be able to access capital markets at discount rates heretofore available only to growth companies. In other words, since non-profits by definition are not profit oriented, non-profits have been hindered in obtaining access to capital markets to the extent that such access is dependent on producing profits. Financial products according to the present invention may make non-profits that have expected growth in sales/revenues an attractive investment and thus provide access to capital at appealing discount rates for those non-profits. Thus, organizations including non-profits and firms can benefit from embodiments of the invention.

Accounting, Issuance, and Valuation of Sales Certificates

The following sections address accounting, issuance, and valuation of sales certificates according to an embodiment of the invention. Section one presents accounting practice appropriate for sales certificates following recent guidance from the American Institute of Certified Public Accountants. Example income statements for a firm issuing debt and for a firm issuing certificates are compared. Section two discusses a process for issuing such certificates. Section three selects a model to adapt for valuation of sales certificates. Example distributions of value for an individual and a portfolio of certificates are also estimated and compared to bond equivalents. Section four concludes.

1 ACCOUNTING

This section discusses the accounting treatment appropriate for sales certificates. Example income statements for a firm issuing debt and for a firm issuing certificates are compared.

1.1 Classification as Debt

The American Institute of Certified Public Accountants (AICPA) Emerging Issues Task Force (EITF) published Issue No. 88-1.8, *Sales of Future Revenues*. That paper discussed the proper accounting procedures when an enterprise receives cash from an investor, and agrees to pay, for a defined period, a specified percentage or amount of the revenue, or of a measure of income, to that investor.

According to 88-18, there are three issues concerning how to classify the cash infusion, of which two apply to sales certificates:—whether the enterprise should classify the proceeds from the investor as debt or as deferred income and how that debt or deferred income should be amortized. The Task Force determined that the presence of any one of the following six factors creates a presumption that classification of the proceeds as debt is appropriate:

1. The transaction does not purport to be a sale (that is, the form of the transaction is debt).
2. The enterprise has significant continuing involvement in the generation of the cash flows due the investor (for example, active involvement in the generation of the operating revenues of a product line, subsidiary, or business segment).
3. The transaction is cancelable by either the enterprise or the investor through payment of a lump sum or other transfer of assets by the enterprise.
4. The investor's rate of return is implicitly or explicitly limited by the terms of the transaction.
5. Variations in the enterprise's revenue or income underlying the transaction have only a trifling impact on the investor's rate of return.
6. The investor has any recourse to the enterprise relating to the payments due the investor.

Since factors one, two and four appear to specifically apply, the proceeds from the issue of Sales Certificates should be treated as debt. Factor one applies because the transaction is not a sale. Factor two applies since the issuer will be involved in the generation of sales that determine the amounts paid to investors. Factor four applies because the investor's rate of return is limited by the percentage of sales and the term of the certificates.

While FASB has not confirmed this understanding, one would expect that the issue would be amortized periodically using the straight-line method, e.g., annually. Some of the excess expense over and above the amortized amount would be deemed interest expense. To the extent that such "excess" is less than the interest rate assumed and stated in the indenture when the certificates were issued, the difference should be recorded as a gain on the financing transaction for that year: to the extent that it is greater, the difference should be recorded as an additional cost on the financing transaction for the applicable year.

1.2 Income Statement Comparison

A comparison of the accounting treatment appropriate for issuers of debt and for issuers of certificates can best be illustrated by a numerical example (similar to the example provided above). Consider a firm with current annual sales of $1,000 M seeking to raise $100 M. Assume that the firm's sales grow by 10% per year, and that the firm operating margin is 40% and corporate tax rate is 35%. Assume also that both the debt and certificate issues have maturities of 10 years and that the issue amounts will be amortized at the rate of 10% per year.

For consistency in valuing portfolios of securities in a later section, assume the bond coupon rate is consistent with a BBB rated bond and take the numerical value of 4.1% using Table 4 of Crouhy, M., D. Galai and R. Mark. (2000). "A comparative analysis of current credit risk models," *Journal of Banking & Finance*, 24, 59-117, denoted in later sections as CGM. Although this value corresponds to a one-year forward rate, one can assume the rate is constant over the term of the issue for simplicity.

For sales certificates, the percent of sales required to service the issue is determined by the value of the issue divided by the present value of sales over the term of the issue. One can assume that the discount rate appropriate for valuing the certificate equals the bond coupon rate so that one can make a comparison of the income statements for both the issuer of debt and the issuer of certificates.

FIG. 6A is an income statement for an issuer of debt. A firm with current annual sales of $1,000 M seeks to raise $100 M. Annual principal and interest payments are made over ten years. Bond coupon rate equals 4.1% (consistent with a BBB rated bond from Table 4 of CGM). Bond principal is amortized at the rate of 10% annually. Firm operating margin equals 40% and corporate tax rate equals 35%. FIG. 6B is an income statement for an issuer of certificates. A firm with current annual sales of $1,000 M seeks to raise $100 M. Certificate expires in ten years and sales grow by 10% annually. Certificate discount rate equals 4.1% (consistent with a BBB rated bond from Table 4 of CGM). Certificate issue amount is amortized at the rate of 10% annually. Firm operating margin equals 40% and corporate tax rate equals 35%. The $100 M raised is 8% of the present value of future sales.

FIGS. 6A and 6B present the income statements resulting from these assumptions. Note that the amount payable to certificate holders in any one year, or in total, may or may not exceed the planned amortization of the certificate amount. When it does, the excess amount, termed participation, is accounted for pre-tax, analogous to debt interest payments. However, while debt interest payments decline over the term of the debt as the principal is repaid, certificate participation rises as sales increase. The result is that in early years, issuers of debt have lower earnings than issuers of certificates: in later years the situation reverses. However, note that, given these income statements use the same interest rate for both securities, the present values of the pre-tax payments to the investors and the cash flow/earnings figures are virtually identical.

2 ISSUING PROCEDURE

This section briefly discusses possible mechanics for issuing sales certificates in a cost effective manner.

2.1 Issuance

As noted above, in one embodiment a web-site generates a standardized prospectus for such issues. The site would be available for broker/dealers who have registered there as underwriters of Sales Certificates. Authorized underwriters enter particulars about the proposed issuer, including the amount of capital to be raised, a sales forecast, a measure of the variability of that forecast, the appropriate term-structure of interest rates and the trustee for the issue. The underlying program calculates the percent of sales to be paid to investors given the above variables. The underwriter, after doing "what-if" analysis, uses the program to generate a standard prospectus and trustee indenture customized for this particular issuer. All that would need to be added to this paperwork for submission to the SEC and potential investors is an Opinion of Counsel that the company has the authority to issue such paper, a relevant financial history of the issuer and a Statement of Purpose as to how the proceeds will be used.

2.2 Statement of Purpose

The Statement of Purpose should address the appropriate size of the issue given the current level of sales and capitalization of the firm. Demonstrating that management is growing the earnings of the firm is a reasonable approach. If sales are profitable, increasing sales increases the stream of residuals accruing to the equity holders; however the leverage involved in issuing paper with a prior claim on revenues increases the volatility of that stream of residuals and thus slows their rate of growth. For instance, chapter 5 of Markowitz, Harry M. (1959) "Portfolio Selection: Efficient Diversification of Investments", Yale University Press, New Haven Conn. notes that one can approximate the compound growth rate as a function of the average growth rate less ½ the variance. The financial literature provides other models that value flows of funds given their volatility. As a minimum, both equity and certificate investors would like to see that the financing is a rational step for the firm that will increase the compound growth rate of earnings. Including such an analysis in the Statement of Purpose will help all concerned to avoid instances where firms over-leverage in terms of the percent of sales used to support an issue.

3 VALUATION

This section selects an approach to adapt for the valuation of sales certificates and provides example distributions of value for an individual certificate and a portfolio of certificates and compares these to bond equivalents.

3.1 Model Selection

Credit risk models have also been advanced in a number of commercial products. CGM provides an often cited and comprehensive analysis of the commercial credit risk products: CreditMetrics, KMV, CreditRisk+ and CreditPortfolioView. The outline of the approach for CreditMetrics along with a number of empirical values presented in this work will be used in the subsequent analysis.

Longstaff, F. A. and E. S. Schwartz. (1995) in "A simple approach to valuing risky fixed and floating rate debt," *The Journal of Finance*, 50 (3), 789-819, denoted in later sections as LS, develop a model for valuing risky corporate debt using a structural approach that is appealing for the simplicity of the resulting closed form solution. This section adapts the LS model for valuing risky corporate debt to value sales certificates because of its conceptual clarity and computational utility.

3.2 Valuation Approach

This section adapts the framework developed by LS for valuing risky corporate debt to valuing sales certificates. This section also presents the numerical procedure used to generate various potential outcomes for investors to be described in a later section.

Six assumptions underlie the LS valuation framework:

Assumption 1:

The total assets of the firm, V, exhibit dynamics $$dV = \mu_V V dt + \sigma_V V dZ_V \quad (1)$$

where $\sigma_V$ is a constant and $dZ_V$ is a standard Weiner process. In the present case, the return to certificate holders is determined using a forecast for the present value of future sales. Therefore, one can consider the dynamics of the total sales of the firm. For any realization of this sales process, and based on the AICPA guidelines, an operating profit results which, when discounted, determines the total value of the firm. Assume, then, that the total sales of the firm, S, exhibit dynamics $$dS = \mu_S S dt + \sigma_S S dZ_S \quad (2)$$

where $\sigma_S$ is a constant and $dZ_S$ is a standard Weiner process.

Assumption 2:

The short-term riskless interest rate, r, exhibits dynamics $$dr = (\zeta - \beta r) dt + \eta dZ_r \quad (3)$$

where $\zeta$, $\beta$ and $\eta$ are constants and $dZ_r$ is also a standard Wiener process exhibiting correlation $\rho$ with $dZ_V$. For adapting the LS framework for valuing sales certificates we assume $dZ_r$ exhibits correlation $\rho$ with $dZ_S$. LS note that these interest rate dynamics are consistent with the Vasicek (1977) model for the term structure and are adopted to enable closed form solution. Since a numerical method will be required here to accommodate the firm valuation procedure, other interest rate dynamics could be used without increasing computational complexity. The interest rate dynamics originally adopted by LS were retained to allow their closed form solution to be used to validate the numerical solution for debt issuers.

Assumption 3:

The value of the firm is independent of the capital structure of the firm.

LS note that this assumption simply means the Modigliani-Miller Theorem holds. The approach followed here is consistent with this assumption. However, for sufficiently small discount rates, the difference in accounting between debt and certificates in our spreadsheet example will lead to slightly differing operating profits and hence, after discounting, slightly differing firm values.

Assumption 4:

Financial distress occurs immediately when the total assets of the firm reach a threshold value.

Financial distress can occur in a firm issuing sales certificates, of course, as it can for debt. For example, sales may provide insufficient cash flow to meet current obligations, including payments to certificate holders, or sales may provide insufficient working capital. No adjustment is made in the present models for the fact that, because Sales Certificates require no fixed payments, the incidence of bankruptcy should be less than when using standard debt instruments.

Assumption 5:

Reorganization follows financial distress resulting in a write-down in the value security holders receive.

Recovery rates for corporate bond holders during reorganization have been well studied. Of course, no data is available to study the recovery rates of firms that have issued sales certificates and defaulted. In order to facilitate the comparison between issuers of debt and issuers of certificates, one can assume that the same recovery rate applies for each. LS note that there is no reason to assume that the recovery rate is constant. One can assume it is drawn from a normal distribution using mean and standard deviation from CGM.

Assumption 6:

Perfect, frictionless markets in which securities trade in continuous time.

This assumption is required in the LS framework so that standard results could be used to derive the price governing partial differential equation. The numerical solution technique employed in our model makes this assumption unnecessary.

The framework adapted to this point applies for an individual firm. In order to consider a portfolio of firms, we must account for the empirical observation that default of one firm is correlated to the default of other firms. The correlation occurs due to the common effects of the macroeconomic environment and due to financial dependencies between firms. The valuation framework can be extended to this case by assuming that the total sales of firm i, $S_i$, exhibit dynamics $$dS_i = \mu_i S_i dt + \sigma_i S_i dZ_i \quad (4)$$

where $\sigma_i$ is a constant and $dZ_i$ is a standard Weiner process. We refer to the covariance matrix relating $dZ_i$ and $dZ_r$ for all i as $\Sigma$.

3.3 Solution

The solution procedure begins by assuming an interest rate spread and average cumulative default rate consistent with the credit rating of the firms in the portfolio: the spread and average cumulative default rate are the same for issuers of debt and issuers of certificates. A baseline value of the firm is determined using a forecast of sales and the appropriate accounting treatment. The level of sales required to service the certificate issue is determined using these baseline values, the risk-free interest rate, and the appropriate spread. Thresholds for default are determined assuming a normal distribution and using average cumulative default rates and baseline firm values. Random paths are generated for the sales of each firm and for the underlying risk free interest rate. The covariance structure is enforced by post-multiplying each vector of innovations by the Cholesky decomposition of the covariance matrix $\Sigma$. The debt or certificate is revalued using the current sales and interest rate path with the appropriate spreads and compared to the default threshold. If default occurs, the security value is written down. Repetition of this process over many paths leads to a distribution of ending values for the issue (see FIG. 7A), or portfolio of issues (see FIG. 7B).

3.4 Example Distributions of Value

Again, a comparison of the distribution of security value for issuers of debt and for issuers of certificates can best be illustrated by a numerical example. Consider a portfolio of firms each with current annual sales of $1,000 M and each seeking to raise $100 M. One can assume each firm issuing debt structures the bond so that annual principal and interest payments are made over ten years. One can assume the portfolio of firms is selected so that bonds having a rating of AAA, AA, A, BBB, BB, B, and CCC are represented. One can chose spreads and average cumulative default rate using values from Table 2, 4 and 6 of CGM. One can assume that all certificate issues will expire in ten years and the discount rate appropriate for valuing all certificates equals the corresponding bond coupon rate so that a comparison of the security value for the issuer of debt and the issuer of certificates can be made. Assume that all debt and certificate issue amounts will be amortized at the rate of 10% annually and that the operating margin is 40% and the corporate tax rate is 35%, for all firms.

Parameters defining the sales and interest rate dynamics must also be specified. Assume that the sales drift rate is 10% annually and that the annualized volatility of sales is 20% for all firms. Assume that the long-run risk free interest rate is 3% with a mean reversion factor of unity and annualized volatility of 3%. The correlation between sales of each firm is 0.6 and between sales and the short-term risk-free interest rate is −0.3. When default occurs, draw a write-down value from a normal distribution with mean of 35.82% and standard deviation of 23.81% based on Table 6 of CGM and corresponding to senior subordinated debt.

Figure 7A:
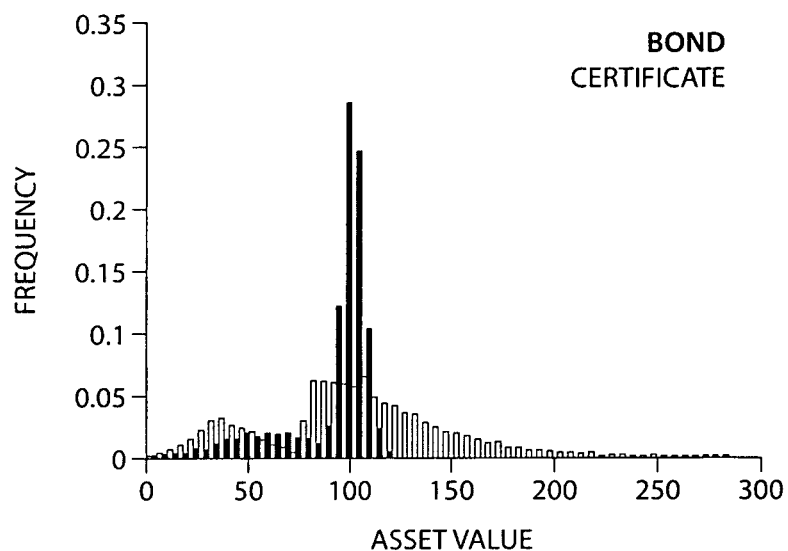
FIG. 7A is a distribution of asset value for comparable debt and certificate issues.
Figure 7B:
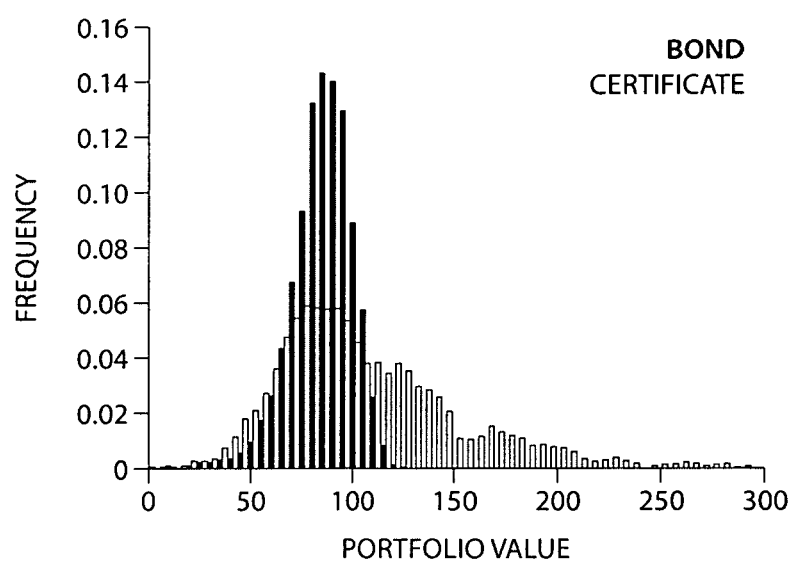
FIG. 7B is a distribution of asset value for comparable debt and certificate portfolios.

FIGS. 7A and 7B illustrate the resulting distributions for an individual BBB rated security and for an equally weighted portfolio of securities. Note that the distribution of debt value exhibits the expected long tail on the downside, while the distribution of certificate value exhibits a broader distribution with a longer tail on the upside.

FIG. 7A is a distribution of asset value for comparable debt and certificate issues. A firm with current annual sales of $1,000 M seeks to raise $100 M. Bond annual principal and interest payments are made over ten years. Bond coupon and certificate discount rate equals 4.1% (consistent with a BBB rated bond from Table 4 of CGM). Average cumulative default rate equals 4.34% (consistent with a BBB rated bond after ten years from table 2 of CGM). Certificate expires in ten years. Bond and certificate issue amount are amortized at the rate of 10% annually. Firm operating margin equals 40% and corporate tax rate equals 35%. Sales drift rate equals 10% annually and annualized volatility equals 20%. Long-run risk free interest rate equals 3% with a mean reversion factor of unity and annualized volatility of 3%. Correlation between sales and the short-term risk-free interest rate is −0.3. Write-downs are drawn from a normal distribution with mean 35.82% and standard deviation 23.81% (consistent with senior subordinated date from Table 6 of CGM). FIG. 7B is a distribution of asset value for comparable debt and certificate portfolios. All firms have current annual sales of $1,000 M and seek to raise $100 M. Bond annual principal and interest payments are made over ten years. Bond coupon and certificate discount rates equal 3.60%, 3.65%, 3.72%, 4.10%, 5.55%, 6.05%, and 7.53% (consistent with a AAA, AA, A, BBB, BB, B, and CCC rated bond from Table 4 of CGM). Average cumulative default rates equal 1.40%, 1.29%, 2.17%, 4.34%, 17.73%, 29.02%, and 45.10% (consistent with a AAA, AA, A, BBB, BB, B, and CCC rated bond after ten years from Table 2 of CGM). Bonds and certificates expire in ten years. Bond and certificate issue amounts are amortized at the rate of 10% annually. Firms' operating margins equal 40% and corporate tax rates equal 35%. Sales drift rate equals 10% annually and annualized volatility equals 20%. Long-run risk free interest rate equals 3% with a mean reversion factor of unity and annualized volatility of 3%. The correlation between sales of each firm is 0.6 and between sales and the short-term risk-free interest rate is −0.3. Write-downs are drawn from a normal distribution with mean 35.82% and standard deviation 23.81% (consistent with senior subordinated date from Table 6 of CGM).

4 CONCLUSIONS

Sales certificates are a new type of security providing a return that is a function of a firm's sales over a specified period of time in the future. Investors benefit from this new security by gaining a clearer understanding of the process that generates their investment returns. AICPA rules determine that the proceeds from the issue of sales certificates should be treated as debt since a periodic percent of sales will be paid to investors and the issuer will be involved in the generation of sales, and because the investor's rate of return is limited by the specified percentage of sales and the term of the certificates. A structural approach for valuing sales certificates is developed by adapting the LS model for valuing risky corporate debt. The distribution of value for sales certificates, or a portfolio of sales certificates, is broader than the distribution of value for comparable debt, or a portfolio of debt issues, and exhibits a significantly longer upside tail.

Having thus described embodiments of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A computer-implemented system for preparing to register a sales participation based financial product offering, the system comprising:
a computer-readable storage device for storing instructions; and
a processor in communication with the computer-readable storage device, the processor operative to utilize the instructions stored in the computer-readable storage device for:
receiving information regarding the amount of an issue desired by a potential issuer;
receiving sales information related to current sales and to sales growth rate for one or more organizations;
receiving discount rate information for the issue;
setting a function of future reported sales of the one or more organizations using the desired issue amount information and a present value of estimated future sales of the one or more organizations in setting the function, the present value being based on the sales information and the discount rate information, the function being configured to later determine an amount to be paid to investors based on the future reported sales of the one or more organizations; and
determining a number of tradable instruments representing investment in the financial product, the act of determining comprising:
receiving a fixed denomination for the tradable instruments; and
dividing the issue amount by the fixed denomination to determine the number of tradable instruments.

2. The system of claim 1, wherein the one or more organizations comprise a combination of organizations that have combined to sell claims on their joint future reported sales.

3. The system of claim 1, wherein setting the function of future reported sales comprises using historical growth rates for sales.

4. The system of claim 1, wherein the discount rate information comprises a discount rate that is mutually agreed upon by the issuer and the investors in light of prevailing market conditions.

5. The system of claim 1, wherein the function of future reported sales is a linear function.

6. The system of claim 1, wherein the financial product expires worthless at maturity.

7. The system of claim 1, wherein setting a function of future reported sales comprises setting a function of future reported sales over a specified period of time.

8. The system of claim 1, wherein the future reported sales comprise at least one of: the future reported sales of the one or more organizations; the future reported sales of a subsidiary of the one or more organizations; and the future reported sales of a division of the one or more organizations.

9. The system of claim 1, wherein setting a function of future reported sales comprises setting a function that is a function solely of future sales.

10. The system of claim 1, wherein setting a function of future reported sales comprises setting a function that is a function of future sales and already completed sales.

11. The system of claim 1, wherein the future reported sales of one or more organizations are defined by sales as reported on an income statement of each of the one or more organizations.

12. The system of claim 1, wherein the one or more organizations comprise the issuer.

13. The system of claim 1, wherein the processor is operative to utilize the instructions stored in the computer-readable storage device for calculating a present value of estimated future sales using an iterative calculation.

\* \* \* \* \*